United States Patent [19]

Liebig

[11] 4,011,786
[45] Mar. 15, 1977

[54] EXPANDABLE DOWEL

[76] Inventor: Heinrich Liebig, Wormser Strasse 23, Pfungstadt, Germany

[22] Filed: Dec. 5, 1975

[21] Appl. No.: 637,957

[30] Foreign Application Priority Data

Dec. 10, 1974 Germany .......................... 2458317

[52] U.S. Cl. ................................................. 85/74
[51] Int. Cl.² ........................................ F16B 13/04
[58] Field of Search .............. 85/62, 67, 69, 73, 74, 85/75, 76, 50 C; 151/35

[56] References Cited

UNITED STATES PATENTS

| 462,601 | 11/1891 | Thinnes | 85/75 |
|---|---|---|---|
| 945,403 | 1/1910 | Mohun | 85/67 |
| 1,276,708 | 8/1918 | Bair | 85/75 |
| 1,368,604 | 2/1921 | Carmody | 151/35 |
| 1,979,686 | 11/1934 | Hall et al. | 85/67 X |
| 2,610,013 | 9/1952 | Gibson | 85/71 X |
| 2,943,528 | 7/1960 | Curry | 85/62 |
| 3,187,621 | 6/1965 | Turner | 85/62 |
| 3,468,091 | 9/1969 | Gerhard | 85/74 X |
| 3,735,665 | 5/1973 | Mortensen | 85/71 |
| 3,911,782 | 10/1975 | Liebig | 85/67 |

FOREIGN PATENTS OR APPLICATIONS

| 803,871 | 7/1936 | France | 151/35 |
|---|---|---|---|
| 505,145 | 4/1920 | France | 85/75 |
| 91,090 | 12/1937 | Sweden | 85/67 |
| 344,832 | 4/1960 | Switzerland | 85/73 |
| 598,730 | 2/1948 | United Kingdom | 85/71 |
| 227,800 | 2/1969 | U.S.S.R. | 85/79 |

*Primary Examiner*—Roy D. Frazier
*Assistant Examiner*—Thomas J. Holko

[57] ABSTRACT

An expandable dowel for insertion into a borehole comprising an expandable sleeve with one or more slots extending from one end thereof and expandable by at least one expanding member which engages the slotted sleeve, a screw-threaded bolt which is in screw-threaded engagement with the expanding member and has a shaft which is passed through a spacer sleeve adjacent the unslotted end of the expandable sleeve. The spacer sleeve is retained on the screw-threaded bolt by a bolt head or a nut screwed upon the screw-threaded bolt. The spacer sleeve, or a washer located between the spacer sleeve and said bolt head or nut is/are constructed so that it/they can be elastically or plastically deformed up to a predetermined amount by a force which acts axially of the bolt.

8 Claims, 7 Drawing Figures

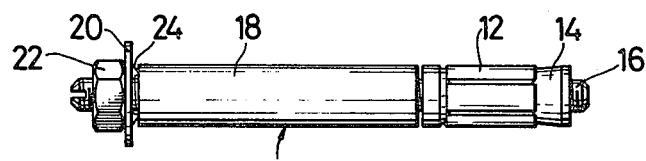
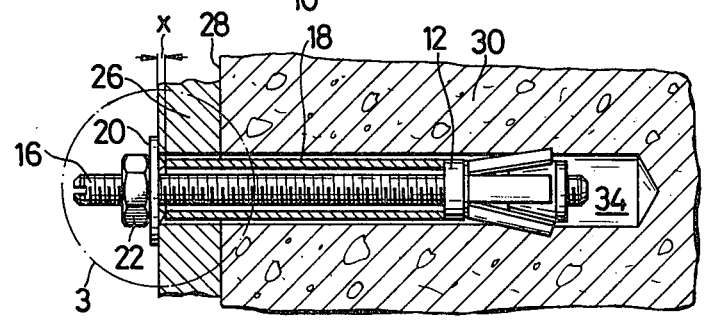
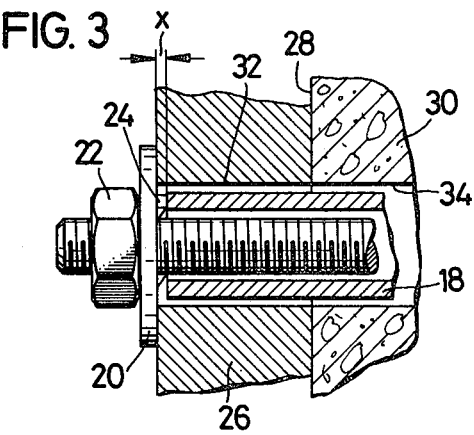
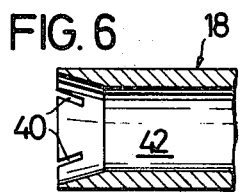
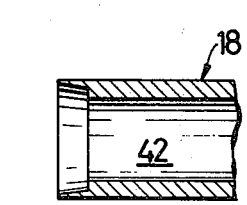
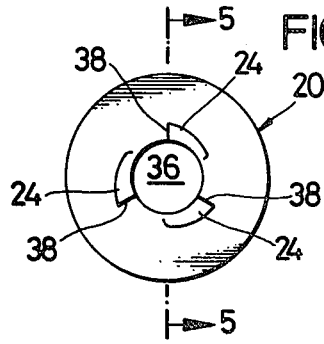
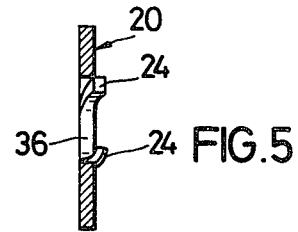

EXPANDABLE DOWEL

BACKGROUND OF THE INVENTION

The invention relates to an expandable dowel or expandable bolt for insertion into a borehole in the masonry or the like.

A prior proposed expandable dowel comprises an expanding sleeve with multiple slots extending from the one end thereof, the slotted portion being expandable by at least one conical expanding member which engages into the slotted end of the sleeve. A screwthreaded bolt extends through the expanding sleeve and is in screwthreaded engagement with the expanding member and has a shaft which is provided with a spacer sleeve adjoining the unslotted end of the expanding sleeve, said spacer sleeve being retained on the screwthreaded bolt by the bolt head or by a nut screwed upon the screwthreaded bolt with an interposed washer. In utilising such a prior proposed dowel, the object to be supported is clampable between the underside of the bolt head or washer and masonry or the like in which a borehole has been formed, the dowel being inserted in the borehole.

Expandable dowels of this kind are used, for example, for mounting items such as a metal plate on a solid wall or the like by insertion of the dowel in a bore in the wall, the dowel also passing through a bore in the specific item. The bores are sufficiently large to ensure that the expandable dowel can be inserted through the aligned bores until the washer or the bolt head abuts on a surface of the item after the item is placed on the wall in the intended mounting position. Rotation of the bolt head or of the nut by means of a suitable tool draws the expanding member into the slotted end of the expanding sleeve so that by said sleeve expands and thus the dowel is anchored in the bore provided in the wall at a depth defined by the length of the spacer sleeve and the expanding sleeve. Since the bolt head or nut can be tightened only until it abuts on the outer endface of the spacer sleeve whose inner endface engages with the expanding sleeve, it is possible that even powerful tightening of the bolt head or of the nut does not permit the item to be anchored sufficiently firmly on the solid wall because no further movement of the bolt head or nut is permissible after the washer or bolt head engages with the spacer sleeve.

BRIEF SUMMARY OF THE INVENTION

According to the present invention there is provided an expandable dowel for insertion into a borehole comprising an expandable sleeve with one or more slots extending from one end thereof and expandable by at least one expanding member which engages the slotted sleeve, a screwthreaded bolt which is in screwthreaded engagement with the expanding member and has a shaft which is passed through a spacer sleeve adjacent the unslotted end of the expandable sleeve, said spacer sleeve being retained on the screwthreaded bolt by a bolt head or by a nut screwed upon the screwthreaded bolt wherein the spacer sleeve or a washer is located between the spacer sleeve and said bolt head or nut constructed so that it can be elastically or plastically deformed by up to a predetermined amount under the influence of a force which acts axially of the bolt. In embodiments of the invention it is necessary to provide only short deformation distances since the items to be mounted by the dowels are generally rigid.

In order to permit such deformation, it is possible to arrange that the mechanical strength of at least one end of the spacer sleeve is weakened for example the ability to withstand axial stress is diminished by a reduction of the material thickness.

In the simplest case, this is achieved by reducing the wall thickness of the spacer sleeve by a short conical counter sink or chamfer. Conveniently the end of the spacer sleeve whose wall thickness is reduced is additionally weakened by slots, such as short axial slots.

As an alternative or in addition to the above is a device where a washer is provided for the desired deformability can be achieved by providing the region of the washer adapted to be within a bore provided in an item which is to be mounted with sections which are pressed out of the washer plane and can be re-deformed into the washer plane by forces acting at right angles, thereto, said sections being directed towards the spacer sleeve and engaging with the end-face of said spacer sleeve when the nut or the bolt head is tightened.

One preferred embodiment of the invention is constructed so that short slots are cut into the washer extending from its central aperture and material situated adjacent to the slots is pressed out of the washer plane.

To this end, it is advisable that at least two, but preferably three, slots are provided at a regular angular distribution around the central aperture.

BRIEF DESCRIPTION OF THE DRAWING

In order that the invention may be more readily understood and so that further features thereof may be appreciated the invention will now be described by way of example with reference to the accompanying drawings, in which:

FIG. 1 is a side view of one embodiment of an expandable dowel in accordance with the invention, FIG. 2 is a part sectional view illustrating the system of mounting an item on a solid wall using the expandable dowel illustrated in FIG. 1, FIG. 3 is a part sectional view to an enlarged scale of the part of the mounting system which is marked by the dash-dot circle 3 in FIG. 2, FIG. 4 shows a washer suitable for use with an expandable dowel in accordance with the invention, FIG. 5 is a sectional view along the line 5—5 of FIG. 4, FIG. 6 is a sectional view illustrating an end part of a spacer sleeve which can be used in an expandable dowel in accordance with the invention, and FIG. 7 is a sectional view corresponding to FIG. 6 and illustrating a modified embodiment of the spacer sleeve.

DETAILED DESCRIPTION OF PREFERRED EMBODIMENTS

FIG. 1 shows an expandable dowel in accordance with the invention and referenced in its entirety with the numeral 10. The dowel 10 comprises an expandable sleeve 12 provided at one end with a plurality of axially extending slots, and a frusto-conical expanding member 14 which engages in to the said slotted end of the sleeve. The expanding member 14 is provided with an internally screwthreaded bore and is in screwthreaded engagement with an elongated screwthreaded bolt 16 which extends through the expandable sleeve 12 and through a spacer sleeve 18 which is disposed adjacent to end in axial alignment with the expandable sleeve. A washer 20 is mounted on the end of the screwthreaded bolt 16 which is remote from the expandable sleeve. A nut 22 which is screw-mounted on the screwthreaded bolt 16 in front of the washer 20 retains the individual components of the expandable dowel 10 and also serves to expand the dowel 10. In place of the nut 22, it is possible for the outer end of the screwthreaded bolt 16 to be provided with a bolt head which is integrally attached to the screwthreaded bolt and to which a spanner can be applied.

A series of projections 24 are stamped to project from the underside of the washer 22 so that the endface of the spacer sleeve 18 nearest to the washer is spaced at a distance from the underside thereof, this spacing being visible in FIG. 1. (see also distance x in FIGS. 2 and 3). The projections 24 are such that they can be re-deformed into the plane of the washer.

FIG. 2 shows the mounting of an item, designated with the numeral 26, on the surface area 28 of a structure 30, in the form of a concrete wall.

The item 26 and the structure 30 are provided with bores of the same diameter in flush alignment, the bore diameter being selected so that the expandable sleeve 12 in its unstressed state, as well as the spacer sleeve, whose diameter approximately equals the diameter of the unstressed expandable sleeve, can be inserted from the outside of the item 24 to be mounted through the bore 32 into the bore 34 until the washer 20 bears upon the surface of the item 26. This kind of mounting in which the dowel is inserted into the bore of the base through the bore of the object which is to be mounted is referred to as insertion mounting.

After the dowel is inserted in the manner described above, the expandable sleeve 12 is expanded by rotation of the nut 22 while the item 26 is simultaneously thrust against the surface area 28, thus anchoring the expandable sleeve 12 in the bore 34. If a conventional flat washer were to be used as washer, it would not be possible to apply additional stress to the mounted item 26 against the surface area 28 because the spacer sleeve 18, whose inner end engages with the expandable sleeve 12, would then engage with the washer with its outer end and further stressing of the item 26, would not be possible.

However, in the illustrated embodiment of the invention the underside of the washer nearest to the spacer sleeve 18 is provided with the previously-mentioned projections 14 which can be re-deformed into the plane of the washer, thus providing an additional stressing path x to provide stress for the item 26 between the surface area 28 and the washer 20. This ensures that the item 26 can be mounted on the surface area 28 with an adequate thrust force, even if the connection initially does not have adequate strength after the expandable sleeve 12 is expanded.

The embodiment of the washer 20 used in conjunction with the expandable dowel 10 illustrated in FIG. 1 is shown in FIGS. 4 and 5. It will be appreciated, however, that other forms of washer could be used. The projections 24 in the washer 20 are formed by cutting at least two and preferably three short radial slots 38 into the flat washer 20 from the central aperture 36 thereof at uniform angular distances from each other, so that the material of the washer adjoining one side of the slot is pressed out of the plane of the washer. The projections 24 thus formed can be re-deformed into the plane of the washer 20 if the nut 22 is sufficiently strongly tightened. The projections 24 are located so that initially, in use, they lie within the bore formed in the item 26 to be mounted by the dowel.

As an alternative to the washer 20 described above or, where appropriate, in conjunction with such a washer, it is also possible for one, or where necessary both, end zones of the spacer sleeve 18 to be constructed so as to provide a specific axial deformability. Spacer sleeves of this kind are shown in FIGS. 6 and 7. The deformability of the sleeves 18 in the end zone of the embodiment illustrated in FIG. 6 is achieved by a reduction of the material thickness of the sleeve 18 in the end zone thereof and by additionally provided slots 40. The wall thickness of the sleeve 18 is reduced by conical countersinking or chamfering of the sleeve bore 42.

The end region of the sleeve bore of the spacer sleeve 18 which is shown in FIG. 7 is expanded by means of an end mill so that the milled region of the sleeve has only a relatively slight wall thickness which is so thin in the illustrated example that no additional slots are required for further weakening of the wall.

The dowel construction generally as described above can be embodied not only in the dowels illustrated in FIG. 1 which can be conically expanded merely by means of an expanding member disposed on the inner end of the dowel, but the deformable washer 20 as well as the deformable spacer sleeve 18 can also be employed in conjunction with cylindrically expanding dowels of the kind disclosed in the German Pat. Specifications Nos. 1,230,621 and 1,625,394. In these dowels an expanding member can be provided in the region of the outer expandable dowel end in addition to the expanding member which is provided on the inner end of the expandable dowel.

It will, of course, be readily appreciated that this invention may be applied to double-expanding dowels. Such cylindrically or double-expanding dowels are disclosed in the above-mentioned Patent Specifications and, the further modification of such dowels to embody this invention requires adaptation only of those parts (spacer sleeve, washer) which are identical to corresponding parts of the dowel described in detail in conjunction with FIGS. 1 and 2, of the accompanying drawings.

The spacer sleeve and the expandable sleeve may, of course, be a single integral member.

It is to be understood that the invention is not limited to the particular embodiments described above, but is solely limited by the scope of the appended claims.

I claim:

1. An expandable dowel for insertion into a borehole, comprising: expandable sleeve means with at least one slot extending from one end thereof, at least one expanding member engaging said sleeve means at said one end for expansion thereof, spacer sleeve means adjacent that end of said expandable sleeve means which is opposite said one end and having an end face, a screw-threaded bolt in screw-threaded engagement with said expanding member and having a shaft which is passed through said spacer sleeve means and said expandable sleeve means, means on said screw-threaded bolt adjacent said spacer sleeve means for retaining said spacer sleeve means on said screw-threaded bolt, and washer means located between said spacer sleeve means and said means on said screw-threaded bolt, said washer means having a first substantially flat portion located outside the projection of a borehole into which the dowel is to be inserted and a second portion within the projection of the borehole, said second portion being provided with deformable sections bent outwardly with respect to the plane of said washer means and extending in a direction toward said spacer sleeve means, whereby upon tightening of said means on said screw-threaded bolt said sections first engage said end face of said spacer sleeve means and thereafter are deformed back into the plane of said washer means.

2. An expandable dowel according to claim 1, wherein said means on said screw-threaded bolt is a bolt head integrally connected to said bolt.

3. An expandable dowel according to claim 1, wherein said means on said screw-threaded bolt is a nut.

4. An expandable dowel according to claim 1, wherein said sections are elastically deformable.

5. An expandable dowel according to claim 1, wherein said sections are plastically deformable.

6. An expandable dowel according to claim 1, wherein said washer means is provided with a central aperture, and with slots extending from said central aperture, said sections being formed by material adjacent said slots bent out of the plane of said washer means.

7. An expandable dowel according to claim 6, wherein at least two slots are provided in equal angular distribution around said central aperture.

8. An expandable dowel according to claim 6, wherein at least three slots are provided in equal angular distribution around said central aperture.

* * * * *